Nov. 7, 1950     M. S. BROCKMAN     2,528,684
SYNCHRONIZER
Filed July 8, 1946     2 Sheets-Sheet 1
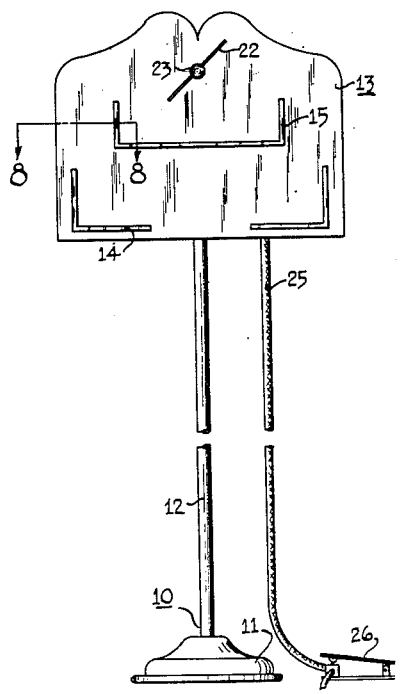
Fig. 1
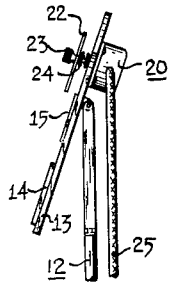
Fig. 3
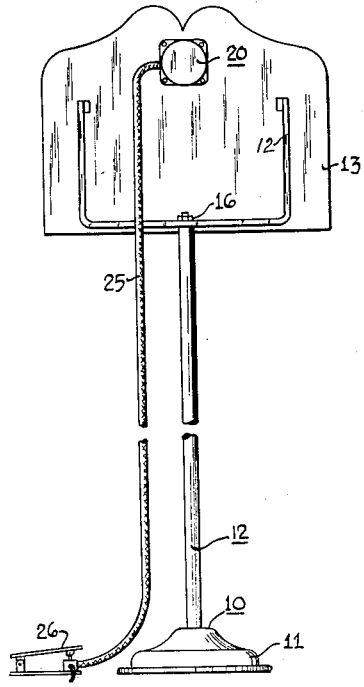
Fig. 2
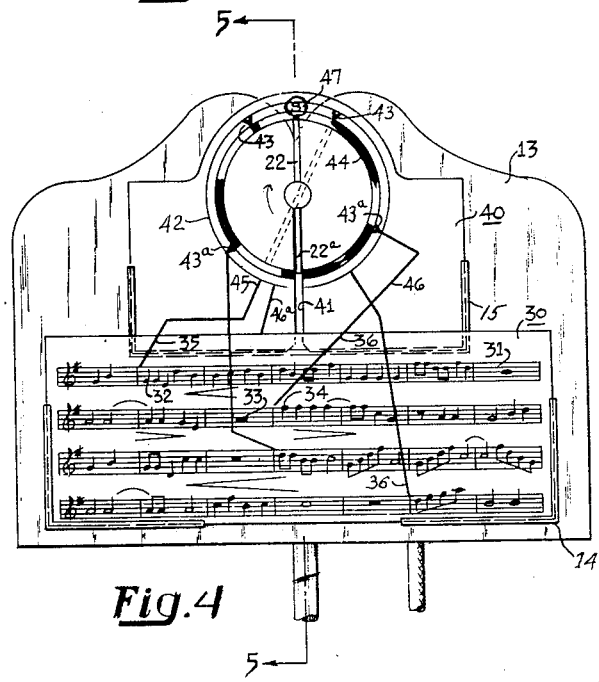
Fig. 4
Fig. 5
Morton S. Brockman Nov. 7, 1950   M. S. BROCKMAN   2,528,684
SYNCHRONIZER Filed July 8, 1946   2 Sheets-Sheet 2

INVENTOR.
Morton S. Brockman

Patented Nov. 7, 1950

2,528,684

UNITED STATES PATENT OFFICE 2,528,684

SYNCHRONIZER

Morton S. Brockman, Cleveland, Ohio

Application July 8, 1946, Serial No. 681,794

8 Claims. (Cl. 84—470)

Conducive to a clearer understanding of this invention it should be noted that most players of musical instruments do not have opportunity to play in bands, orchestras, or in accompaniment with other musical instruments.

Attempts have been made in the past to provide phonographic recordings of bands or orchestras with one part thereof missing, which part a player may provide by playing his instrument simultaneously with the phonograph record. These special phonograph records and special musical scores have had relatively small commercial acceptance, because it takes considerable skill, more than average ability and a rare sense of timing, to coordinate the playing with the record. If rests appear in the score the timing is usually disturbed and the pleasure of playing with an orchestra or band is lost.

The instant invention relies on the fact that all modern conventional phonograph records designed for musical entertainment and pleasure rotate, when properly played, on the phonograph turn-table at a constant standard rate of speed of seventy-eight revolutions per minute. It is therefore possible to coordinate the record with a standard, or slightly modified standard, electric clock mechanism.

Therefore, by coordinating an electric clock mechanism with a record player it is possible to provide means for directing a player so that he may accompany the phonograph record exactly as the score is written and as the composer of the music intended it to be played.

It is, therefore, the primary object of this invention to provide a synchronizing means that would enable an inexperienced musician to play a musical score in accurate acompaniment with a phonograph playing a composition embodying the same score.

Another object is to provide a coordinating means for assisting a person to read the musical score or strain, or part of a composition being played by a concert of instruments.

A further object is to provide an educational device which facilitates a novice to practice an instrument, learn a musical score, or to better understand a professionally recorded rendition of a musical composition.

Still another object of this invention is to better enable a player to accompany a series or album of records played in quick sequence.

These and other objects of the invention will become apparent from a reading of the following description and claims together with the accompanying drawing, wherein like parts are referred to and indicated by like reference characters and wherein:

Figure 1 is a front view of a music stand embodying a synchronizing device for supporting a music score and chart;

Figure 2 is a rear view of the stand shown in Figure 1;

Figure 3 is a side view of the same;

Figure 4 is an enlarged view of the support having the musical score and a chart mounted thereon;

Figure 5 is a vertical cross-sectional view of the device taken along the line and in the direction of the arrows 5—5 of the Figure 4;

Figure 6:
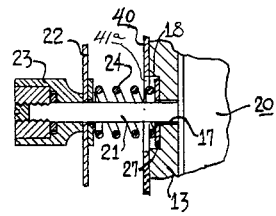
Figure 6 is an enlarged view of the pointer or indicator mounted on the time piece arbor.
Figure 7:
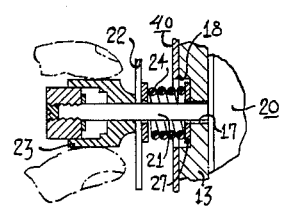
Figure 7 is a view similar to that of Figure 6 showing alternate positions of the pointer.
Figure 8:
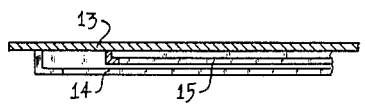
Figure 8 is a sectional view of the portion of the stand taken along the line and in the direction of the arrows 8—8 of the Figure 1.

Referring to the drawing there is shown a synchronizing device and apparatus made in accordance with this invention. The device consists broadly of four elements or members; the support, the clock-mechanism, the score and the chart. Each of these members are broadly indicated by the reference characters 10, 20, 30 and 40, and will be described in detail in the order stated. The phonograph record and player which is used in conjunction with this synchronizer is not shown, since it is conventional and well known in the music art.

The stand 10 consists of a floor base 11, an upright shaft 12, and the rack or support 13 mounted on the shaft 12 by means of the nut 16. If it is desired to rest the support 13 on a table or other base, the nut 16 may be easily removed and the shaft separated therefrom.

The support 13 has a hole 17 therethrough which receives the arbor 21 of the hereinafter described clock-mechanism 20. Below the hole 17 there is a bracket 15 for temporarily supporting, in a predetermined fixed position, the hereinafter described chart or charts 40. This bracket 15 is simply a grooved frame that has bottom and side pieces as shown, which holds a chart in one certain position with respect to the pointer 22 and the printed score 30.

Below the bracket 15 there are a pair of similar brackets 14 which temporarily support, in a predetermined fixed position, the printed score or composition 30. These brackets 14 are made so that a score, in book or sheet form, may be held thereby and so that the pages thereof may be quickly and easily turned. The brackets 14 and 15 are so arranged, and the dimensions of the score and charts 30 and 40 respectively, are such that the top edge of the score overlaps the bottom edge of the chart 40 slightly as shown.

The clock mechanism or metronome 20 is simply an electric clock of which the minute and hour hands have been removed and the sweep second hand of which has been geared down to one-fourth its former normal speed. This clock mechanism is also referred to herein as a chronograph. This chronograph is mounted on the back of the support as shown in Figures 2, 3 and 5 of the drawing. It has an electric conductor 25 which leads to the power source, and which conductor also has a pedal switch 26 which enables it to be started and stopped conveniently at will.

The arbor 21 freely fits the hole 17 of the support and is allowed to turn therein with as little friction as possible. A collar 27 fits into the recess 18 around the hole 17. This fits around the arbor 21 and provides a solid back for the spring 24.

The pointer has a primary end designated by the character 22 and a secondary end similarly designated by the character 22a. It is attached to a manually turnable knob 23, and both the knob and the pointer are normally held in engagement with the arbor 21 by the small expansion spring 24.

The pointer 22 may be set or reset as desired, either while the clock mechanism 20 is operating or not operating. The pointer, therefore, may be set at any desired position by pressing inwardly on the knob 23 and turning it and the pointer in either a clock-wise or counter-clockwise direction, as desired. Once it is set, the knob released and the electricity turned on, the pointer will move in clock-wise direction until stopped or reset.

The printed score 30 is an arrangement for the instrument or instruments only that are to be played in accompaniment with the concert of instruments heard on the record. Its sheets or pages are of a dimension which enables it to fit neatly in the aforementioned brackets 14 without side play. It is conventional in every respect except that its rests 33 are condensed and not spaced out into the exact number of bars that the particular instrument actually rests in the recorded rendition of the composition. One indicated rest 33 may be for a few seconds or for several minutes.

The printed score differs from conventional music scores in that it has printed thereon in a distinct fashion guide lines 35 and 36. The guide line 35 leads from the top edge of the score sheet to the first note to be played by the real instrument. The guide lines 36 similarly lead to the first note to be played after a musical rest 33 from the top edge of the page. The top edge of the score sheet 30 should be above the horizontal portion of the bracket 15.

Figure 9:
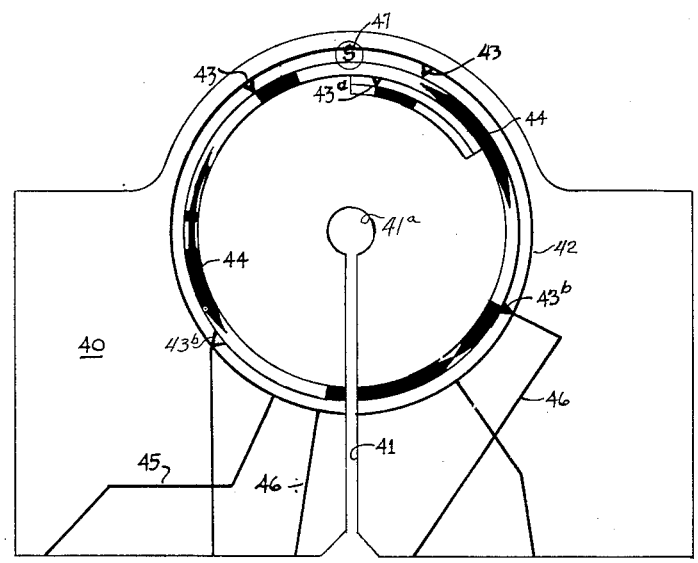
Figure 9 is an enlarged view of the special chart used with the synchronizer.

Each of the novel charts 40 are made of fairly stiff sheets of paper and are die cut somewhat like the chart shown in Figure 9. It has a width sufficient to enable it to neatly fit into the brackets 15 without side play. The bottom edge of the chart should be below the top edge of the printed score. The score 30 and charts 40 should harmonize and appear as one when viewed from the front.

Each chart has a vertical slot 41 and a central opening 41a for clearance with the arbor 21 and spring 24. Each chart 40 has a dial-like face portion 42 around which there are signals or indicia which the player is to follow during accompaniment with the phonograph record. The first signals are V-shaped marks simulating arrow heads 43, and these indicate the instants or moments for starting the play when the rotating indicator 22 reaches that point. There are also marks 44 which indicate both the duration of the playing time of the real instruments, as well as, the volume or other character of the desired play. For example, a thick line 44 may indicate loud tone and a thin line soft tone. The chart also has guide lines 45 and 46 on the face thereof which visibly connect and blend with the aforementioned guide lines 35 and 36 on the printed score.

The printed score and chart should be so made that the player may quickly and easily follow the guide lines from the pointer end down to the note or notes to be played by him. By making the indicator 22/22a in a distinctive color, such as red, and by printing the guide lines 35, 36, 45 and 46 in the same color, the chart and score are easier to follow and read. The members should be as compact and close together as possible so that there will be relatively little eye strain. When properly designed the score and synchronizer may be played and followed with no more effort than is required to watch a conductor and a score when playing with several other persons in an orchestra.

Since it is possible that more than one page of the score might have to be played before the chart and record are to be changed, some guide lines 46 will blend with lines 36 on one page of the score, and other lines such as line 46a (Figure 4) will blend with guide lines 36 on another page.

Each phonograph record has its own special chart, and the charts like records may be printed on both sides of the sheet. Most twelve inch phonograph records play about three and a half to four minutes, a few play a little over five minutes; and ten inch records play proportionately less. Therefore, one revolution or less of the pointer 22 will correspond with the playing of the record, if the record plays less than four minutes. However, if by chance the record plays longer than four minutes, signals or indicia for the additional time may be printed in a smaller circle or arc on the dial 42. In the Figure 9 there is shown such starting point indicated by the character 43a in a smaller arc.

To facilitate reading of the signals and indicia of the chart 40, some guide lines are read and followed from the primary end 22 of the pointer, and others along the pointer and out from the secondary end 22a thereof. For example: the starting note 32 of the score is on the extreme left side of the score page 30, while the starting signal 43 thereof is at the upper right of the chart 40. The guide line, therefore, is to be followed from the secondary end 22a of the pointer as is indicated in the Figure 4. In that case the starting V or arrow point faces inward while the other starting points or arrows 43b face outward.

For use and operation the player sets up the support 12 near a phonograph. A record, or stack of records, is placed on the phonograph and the chart or charts corresponding to the order and arrangement of the records is mounted on the support 13 in the brackets 15. The score 30 in corresponding orderly arrangement is mounted on the brackets 14 as shown. The pointer 22 is set to its vertical or starting position indicated by the character 47. The phonograph is started and immediately upon the sound of the first musical note the foot-switch 26 is pressed and the metronome or clock mechanism is started in operation. The player may be directed to play immediately or there may be a pause or delay before starting. For example; as indicated in the Figure 9 there is shown a pause of about one-half minute before the player is directed to play. This is the time it would take for the pointer 22 to travel from the starting point 47 for the record to the starting point 43 for the accompanying instrument. When the pointer 22 reaches the end of the last indicia 44, the current is cut off, the chart 40 is turned or replaced and the pointer 22 is reset to the vertical or starting position indicated by the reference character 47. The player then continues as before.

With this device it is possible to assemble an album of symphonic records on a phonograph having an automatic changer and arrange a corresponding number of charts and score sheets on a synchronizer of this design, and play the entire arrangement with relatively little trouble, delay or confusion. Since it generally takes about fifteen to twenty seconds for automatically changing phonograph records, the time is ample for the player to change the chart, reset the pointer, turn the printed score sheet and be ready to start the synchronizer when the first musical note of the next phonograph record is played.

Among the many advantages that this device has, is the one that enables the player of the real instrument to follow the music while he is not playing his instrument and then to pick up the score at a convenient starting point without distrubing the phonograph record or apparatus. No special phonograph records or apparatus are necessary. The only parts that are special are the charts and score sheets which are printed and arranged to accompany the particular phonographic rendition.

The charts have ample room for special notations or instructions. A player may choose to cut out strains or add cadenzas according to his own preference. In that event private or personal notations or instructions may be easily written on the sheets and charts. Teachers of music may desire to emphasize special passages, or to have a student note some unusual quality of the record, and similarly such notes may be made on the charts and sheets.

Furthermore, it should be noted that his synchronizer now makes it possible to obtain systematic musical instruction from phonograph records in a manner similar to coordinated recorded and printed instructions now available for learning languages at home without personal instruction. By means of simply coordinated visible and audible instructions arranged in an orderly, progressive manner and synchronized with this device, a person with ordinary intelligence may learn to play almost any musical instrument without the aid of a teacher.

While the novel synchronizer has been described for use with musical accompaniment, it should be understood that there may be other applications of this device. It could well be used to synchronize any personal acts with predetermined instructions. For example: it could be used in radio stations to time broadcasts and to introduce certain sound effects with a prepared script. It could be used to synchronize acts of persons in different studios or places in accordance with a pre-arranged plan.

Having thus disclosed the invention in its preferred form, it should be understood that since there may be other forms or modifications of the device, no limitations to this patent are intended except those lawfully imposed thereon by the scope of the following claims.

I claim:

1. A theme synchronizing and translating device adaptable for use with correlated visible and audible records of a musical composition, comprising a support member, a chart mounted on the support member and having indicia correlated with the themes of the audible record, the said chart having guide lines thereon leading from the said indicia to the margin thereof, a book mounted on the support member in a predetermined position with respect to the chart and having a series of visible translations of the said themes, the said book having guide lines thereon leading from the margin thereof to the said translations, the said chart and book guide lines being in registration and appearing continuous, and a chronometer mounted on the support member and having a movable pointer directly indexing the chart indicia and simultaneously indirectly indexing the book translation through the registered guide lines.

2. A music rack of the type adaptable for use to synchronize a visible record of a musical composition with the sound record of the same, comprising in combination, a support member having two brackets thereon, the first of said brackets having means for retaining a chart coordinated with the sound record in a predetermined position, the second of said brackets having means for retaining a music book coordinated with the visible record in a predetermined position with respect to the said chart, and a chronometer mounted on the support member and having a pointer readable on the chart and on the book simultaneously whereby a theme of the sound record is indicated on the visible record.

3. A music rack of the type defined in claim 2 and further characterized by having a manually operable means for setting the pointer with respect to indicium on the chart.

4. A theme synchronizing and translating device adaptable for use with correlated visible and audible records of a musical composition, comprising in combination, a rack member; a chronograph coordinately operable with an audible record of the composition mounted on the rack member, the said chronograph including a chart having indicia thereon relating to a period of time during which a desired theme of the said musical composition is audible, the said chronograph having a movable pointer readable on the chart and capable of indicating the beginning and the ending of the said theme time period; and a support means on the rack member adapted to retain a page of musical notes and symbols in a predetermined position with respect to the said chronograph chart indicia, the said page including the part of the said musical composition constituting the desired audible theme thereof indicatable by the said movable pointer.

5. A theme synchronizing and translating device adaptable for use with correlated visible and audible records of a musical composition, comprising in combination, a rack member, a support means mounted on the rack member and retaining a sheet of music having thereon an indicated desired part of the aforesaid visible record, and a chronograph mounted on the rack member and coordinately operable with the audible record of the aforesaid musical composition, the said chronograph having a chart mounted thereon in a predetermined position with respect to the said sheet of music, the said chart having a first indicium thereon indicating graphically a period of time during which a desired theme of the said audible record may be heard and a second indicium thereon connecting the first indicia with the indicated desired part of the said visible record, the said chronograph also having a movable pointer readable on the said indicia in a manner whereby the desired part and theme may be read and heard simultaneously.

6. A theme synchronizing and translating device adaptable for use with correlated visible and audible records of a musical composition, comprising in combination, a rack member; a chronometer having a movable pointer mounted on the rack member and coordinately operable with the audible record of the musical composition, a first support means on the rack member proximate to the chronometer and adapted to retain thereon a chart having indicia capable of being made intelligible by the said movable pointer, and a second support means on the rack member adapted to retain thereon a visible record of the part of the said musical composition corresponding with the aforesaid chart indicia, the said second support means having guide portions adapted to fix the said visible record in a predetermined position with respect to the said chart whereby the chart indicia and the visible record part may be followed and read together and whereby the said audible record thereof may be interpreted simultaneously therewith.

7. A theme synchronizing and translating device adaptable for use with correlated visible and audible records of a musical composition, comprising in combination, a rack member including a support for retaining a visible record of desired parts of the said musical composition, and a chronograph mounted on the rack member coordinately operable with the said musical composition and including a chart connected to the said visible record in a manner whereby a desired them of the audible record may be followed and interpreted simultaneously with the reading of the corresponding desired part of the said visible record.

8. A music rack, comprising in combination, a support member, a chronometer mounted on the support member and including a movable pointer, a first bracket member mounted on the support member adjacent to the chronometer and adapted to retain a chart having indicia thereon capable of being made intelligible by the said pointer, and a second bracket member mounted on the support member proximate to the first bracket member and adapted to retain a sheet of music contiguous to and in a predetermined fixed position with respect to the said chart.

MORTON S. BROCKMAN.

REFERENCES CITED

The following references are of record in the file of this patent:

UNITED STATES PATENTS

| Number | Name | Date |
|---|---|---|
| 1,261,382 | Grimson | Apr. 2, 1918 |
| 1,784,489 | Kent | Dec. 9, 1930 |
| 2,138,875 | Miessner | Dec. 6, 1938 |
| 2,150,967 | Franz | Mar. 21, 1939 |
| 2,324,315 | Miessner | July 13, 1943 |
| 2,412,061 | Quidas | Dec. 3, 1946 |

FOREIGN PATENTS

| Number | Country | Date |
|---|---|---|
| 136,599 | Germany | Dec. 15, 1902 |